United States Patent [19]
Dokic et al.

[11] Patent Number: 6,145,007
[45] Date of Patent: Nov. 7, 2000

[54] INTERPROCESSOR COMMUNICATION CIRCUITRY AND METHODS

[75] Inventors: Miroslav Dokic; Raghunath Rao; Jeffrey Niehaus; Zheng Luo; James Divine, all of Austin, Tex.

[73] Assignee: Cirrus Logic, Inc.

[21] Appl. No.: 08/969,883

[22] Filed: Nov. 14, 1997

[51] Int. Cl.[7] .................................................. G06F 13/00
[52] U.S. Cl. ............................ 709/230; 710/260; 710/48
[58] Field of Search ................................... 709/230, 237; 710/47, 48, 260

[56] References Cited

U.S. PATENT DOCUMENTS

| | | | |
|---|---|---|---|
| 4,984,190 | 1/1991 | Katori et al. ............................. | 709/237 |
| 5,283,869 | 2/1994 | Adams et al. ........................... | 709/237 |
| 5,448,735 | 9/1995 | Anderson et al. ....................... | 709/100 |
| 5,490,271 | 2/1996 | Elliott et al ............................. | 710/268 |
| 5,590,288 | 12/1996 | Castor et al. ........................... | 709/201 |
| 5,822,522 | 10/1998 | Kazama .................................. | 709/233 |
| 5,822,595 | 10/1998 | Hu ........................................... | 710/264 |
| 5,848,295 | 12/1998 | Anderson et al. ......................... | 710/7 |
| 5,910,178 | 6/1999 | Moh et al. ................................ | 709/232 |
| 5,925,099 | 7/1999 | Futral et al. ............................. | 709/204 |
| 6,009,389 | 12/1999 | Dokic et al. ............................ | 704/228 |
| 6,012,142 | 1/2000 | Dokic et al. ................................ | 713/2 |

*Primary Examiner*—Kenneth R. Coulter
*Attorney, Agent, or Firm*—James J. Murphy, Esq.; Peter J. Rutkowski, Esq.

[57] ABSTRACT

A method of exchanging messages between first and second processors. A pending flag in a first register is polled by the first processor and if the flag is in a first selected logic state, a message is written into a second register with the first processor. The pending flag is set to a second selected logic state with the first processor and an interrupt to the second processor is generated. The message is read from the second register with the second processor when the pending flag is in the second logic state. The pending flag set to the first logic state with the second processor.

20 Claims, 4 Drawing Sheets

INTERPROCESSOR COMMUNICATION CIRCUITRY AND METHODS

CROSS-REFERENCE TO RELATED APPLICATION

The following co-pending and co-assigned application contains related information and is hereby incorporated by reference: Ser. No. 08/970,979, entitled "DIGITAL AUDIO DECODING CIRCUITRY, METHODS AND SYSTEMS", filed Nov. 14, 1997;

Ser. No. 08/970,794, entitled "METHODS FOR BOOTING A MULTIPROCESSOR SYSTEM", filed Nov. 14, 1997;

Ser. No. 08/970,372, entitled "METHODS FOR DEBUGGING A MULTIPROCESSOR SYSTEM", filed Nov. 14, 1997;

Ser. No. 08/969,884, entitled "METHODS FOR UTILIZING SHARED MEMORY IN A MULTIPROCESSOR SYSTEM", filed Nov. 14, 1997;

Ser. No. 08/970,796, entitled "ZERO DETECTION CIRCUITRY AND METHODS", filed Nov. 14, 1997;

Ser. No. 08/970,841, entitled "A VOLTAGE CONTROLLED CRYSTAL OSCILLATOR", filed Nov. 14, 1997;

Ser. No. 08/971,080, entitled "METHOD FOR ERROR CONCEALMENT IN AN AUDIO DECODING SYSTEM", filed Nov. 14, 1997; and Ser. No. 08/970,302, entitled "METHODS FOR DEBUGGING A MULTIPROCESSOR SYSTEM", filed Nov. 14, 1997.

BACKGROUND OF THE INVENTION

1. Field of the Invention

The present invention relates in general to data processing and in particular, to methods and circuitry for interprocessor communication.

2. Description of the Related Art

The ability to process audio information has become increasingly important in the personal computer (PC) environment. Among other things, audio is important in many multimedia applications, such as gaming and telecommunications. Audio functionality is therefore typically available on most conventional PCs, either in the form of an add-on audio board or as a standard feature provided on the motherboard itself. In fact, PC users increasingly expect not only audio functionality but high quality sound capability. Additionally, digital audio plays a significant role outside the traditional PC realm, such as in compact disk players, VCRs and televisions. As the audio technology progresses, digital applications are increasingly sophisticated as improvements in sound quality and sound effects are sought.

One of the key components in many digital audio information processing systems is the decoder. Generally, the decoder receives data in a compressed form and converts that data into a decompressed digital form. The decompressed digital data is then passed on for further processing, such as filtering, expansion or mixing, conversion into analog form, and eventually conversion into audible tones. In other words the decoder must provide the proper hardware and software interfaces to communicate with the possible compressed (and decompressed) data sources, as well as the destination digital and/or audio devices. In addition, the decoder must have the proper interfaces required for overall control and debugging by a host microprocessor or microcontroller. Further, the decoder must also perform additional functions appropriate to the decoder subsystem of a digital audio system, such as the mixing of various received digital and/or audio data streams.

During processing of streaming data, such as audio data (compressed or decompressed), it is essential that the processing device or system be capable of throughputting data accurately and with the requisite speed. One way of insuring this is by providing efficient communications between the various processing blocks within the given system or device. This is especially true when multiple processors are utilized. Thus, the need has arisen for circuits and methods of maintaining efficient communication between processing blocks, for use in such applications as advanced audio decoders.

SUMMARY OF THE INVENTION

According to the principles of the present invention, a method is provided for exchanging messages between first and second processors. A pending flag in a register is checked with the first processor. If the flag is in a first selected logic state, a message is written into a second register with the first processor. The first processor sets the pending flag to a second selected logic state and an interrupt to the second processor is generated. The message from the second register is read with the second processor when the pending flag is in the second logic state. The pending flag is set to the first logic state with the second processor.

The principles of the present invention provide for efficient communication between processing blocks within given system or device. Among other applications, these principles can be utilized in the design and operation of systems such as those processing streaming data, where accurate and high speed throughput are essential. An example of such application is in audio decoders which process compressed or decompressed streams of data at relatively high speeds.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

The principles of the present invention and their advantages are best understood by referring to the illustrated embodiment depicted in FIGS. 1A, 1B, 1C, 2, 3, 4, 5A, and 5B of the drawings, in which like numbers designate like parts.

Figure 1A:
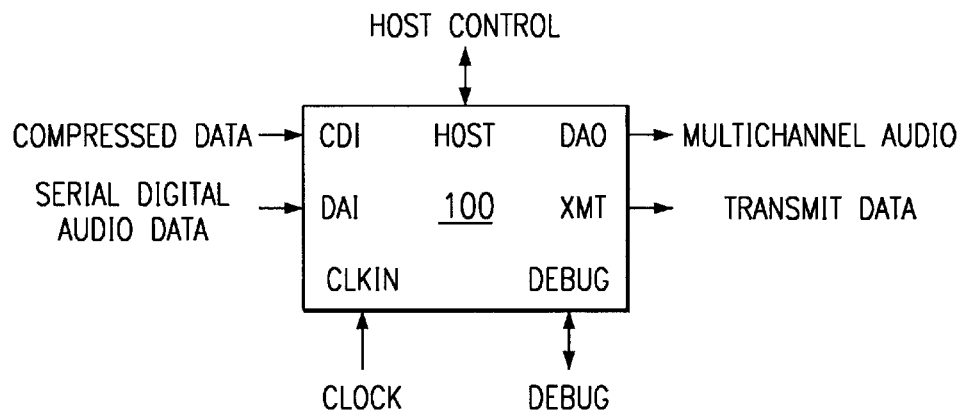
FIG. 1A is a diagram of a multichannel audio decoder embodying the principles of the present invention.

FIG. 1A is a general overview of an audio information decoder 100 embodying the principles of the present invention. Decoder 100 is operable to receive data in any one of a number of formats, including compressed data in conforming to the AC-3 digital audio compression standard, (as defined by the United States Advanced Television System Committee) through a compressed data input port CDI. An independent digital audio data (DAI) port provides for the input of PCM, S/PDIF, or non-compressed digital audio data.

A digital audio output (DAO) port provides for the output of multiple-channel decompressed digital audio data. Independently, decoder 100 can transmit data in the S/PDIF (Sony-Phillips Digital Interface) format through a transmit port XMT.

Decoder 100 operates under the control of a host microprocessor through a host port HOST and supports debugging by an external debugging system through the debug port DEBUG. The CLK port supports the input of a master clock for generation of the timing signals within decoder 100.

While decoder 100 can be used to decompress other types of compressed digital data, it is particularly advantageous to use decoder 100 for decompression of AC-3 bits streams.

Therefore, for understanding the utility and advantages of decoder 100, consider the case of when the compressed data received at the compressed data input (CDI) port has been compressed in accordance with the AC-3 standard.

Generally, AC-3 data is compressed using an algorithm which achieves high coding gain (i.e., the ratio of the input bit rate to the output bit rate) by coarsely quantizing a frequency domain representation of the audio signal. To do so, an input sequence of audio PCM time samples is transformed to the frequency domain as a sequence of blocks of frequency co-efficient. Generally, these overlapping blocks, each of 512 time samples, are multiplied by a time window and transformed into the frequency domain. Because the blocks of time samples overlap, each PCM input sample is represented by two sequential blocks factor transformation into the frequency domain. The frequency domain representation may then be decimated by a factor of two such that each block contains 256 frequency coefficients, with each frequency coefficient represented in binary exponential notation as an exponent and a mantissa.

Next, the exponents are encoded into coarse representation of the signal spectrum (spectral envelope), which is in turn used in a bit allocation routine that determines the number of bits required to encoding each mantissa. The spectral envelope and the coarsely quantized mantissas for six audio blocks (1536 audio samples) are formatted into an AC-3 frame. An AC bit stream is a sequence of the AC-3 frames.

In addition to the transformed data, the AC bit stream also includes a number of additional information. For instance, each frame may include a frame header which indicates the bit rate, sample rate, number of encoded samples, and similar information necessary to subsequently synchronize and decode the AC-3 bit stream. Error detection codes may also inserted such that the device such as decoder 100 can verify that each received frame of AC-3 data does not contain any errors. A number of additional operations may be performed on the bit stream before transmission to the decoder. For a more complete definition of AC-3 compression, reference is now made to the digital audio compression standard (AC-3) available from the advanced televisions systems committee, incorporated herein by reference.

In order to decompress under the AC-3 standard, decoder 100 essentially must perform the inverse of the above described process. Among other things, decoder 100 synchronizes to the received AC-3 bit stream, checks for errors and deformats received AC-3 data audio. In particular, decoder 100 decodes spectral envelope and the quantitized mantissas. Among other things, a bit allocation routine is used to unpack and de-quantitize the mantissas. The spectral envelope is encoded to produce the exponents, then, a reverse transformation is performed to transform the exponents and mantissas to decoded PCM samples in the time domain.

Figure 1B:
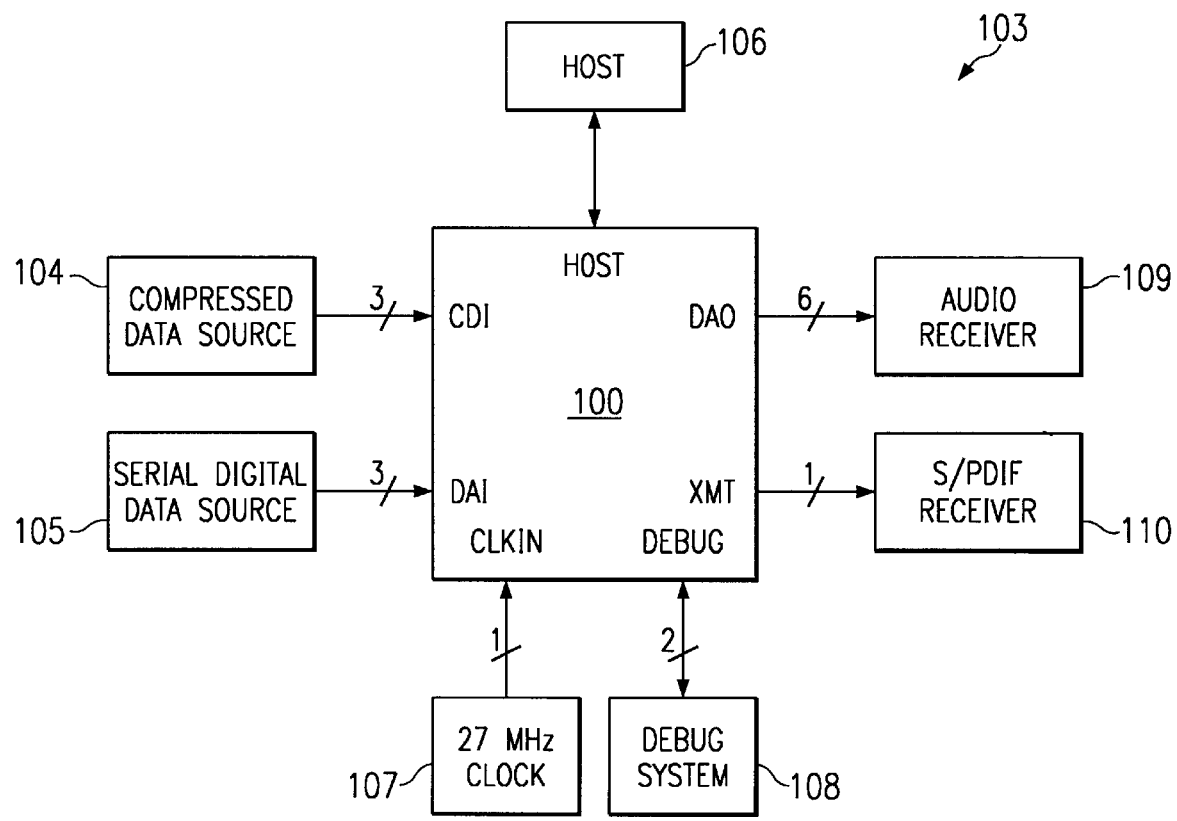
FIG. 1B is a diagram showing the decoder of FIG. 1 in an exemplary system context.

FIG. 1B shows decoder 100 embodied in a representative system 103. Decoder 100 as shown includes three compressed data input (CDI) pins for receiving compressed data from a compressed audio data source 104 and an additional three digital audio input (DAI) pins for receiving serial digital audio data from a digital audio source 105. Examples of compressed serial digital audio source 105, and in particular of AC-3 compressed digital sources, are digital video discs and laser disc players.

Host port (HOST) allows coupling to a host processor 106, which is generally a microcontroller or microprocessor that maintains control over the audio system 103. For instance, in one embodiment, host processor 106 is the microprocessor in a personal computer (PC) and System 103 is a PC-based sound system. In another embodiment, host processor 106 is a microcontroller in an audio receiver or controller unit and system 103 is a non-PC-based entertainment system such as conventional home entertainment systems produced by Sony, Pioneer, and others. A master clock, shown here, is generated externally by clock source 107. The debug port (DEBUG) consists of two lines for connection with an external debugger, which is typically a PC-based device.

Decoder 100 has six output lines for outputting multichannel audio digital data (DAO) to digital audio receiver 109 in any one of a number of formats including 3-lines out, 2/2/2, 4/2/0, 4/0/2 and 6/0/0. A transmit port (XMT) allows for the transmission of S/PDIF data to an S/PDIF receiver 110. These outputs may be coupled, for example, to digital to analog converters or codecs for transmission to analog receiver circuitry.

Figure 1C:
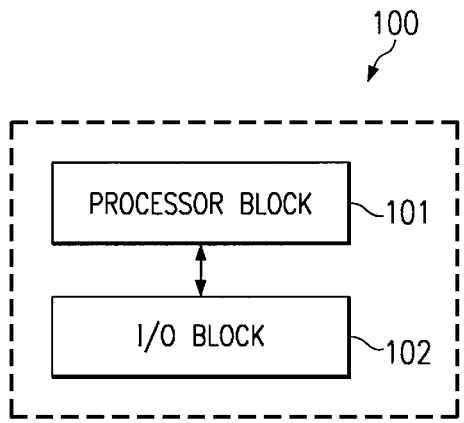
FIG. 1C is a diagram showing the partitioning of the decoder into a processor block and an input/output (I/O) block.

FIG. 1C is a high level functional block diagram of a multichannel audio decoder 100 embodying the principles of the present invention. Decoder 100 is divided into two major sections, a Processor Block 101 and the I/O Block 102. Processor Block 106 includes two digital signal processor (DSP) cores, DSP memory, and system reset control. I/O Block 102 includes interprocessor communication registers, peripheral I/O units with their necessary support logic, and interrupt controls. Blocks 101 and 102 communicate via interconnection with the I/O buses of the respective DSP cores. For instance, I/O Block 102 can generate interrupt requests and flag information for communication with Processor Block 101. All peripheral control and status registers are mapped to the DSP I/O buses for configuration by the DSPs.

Figure 2:
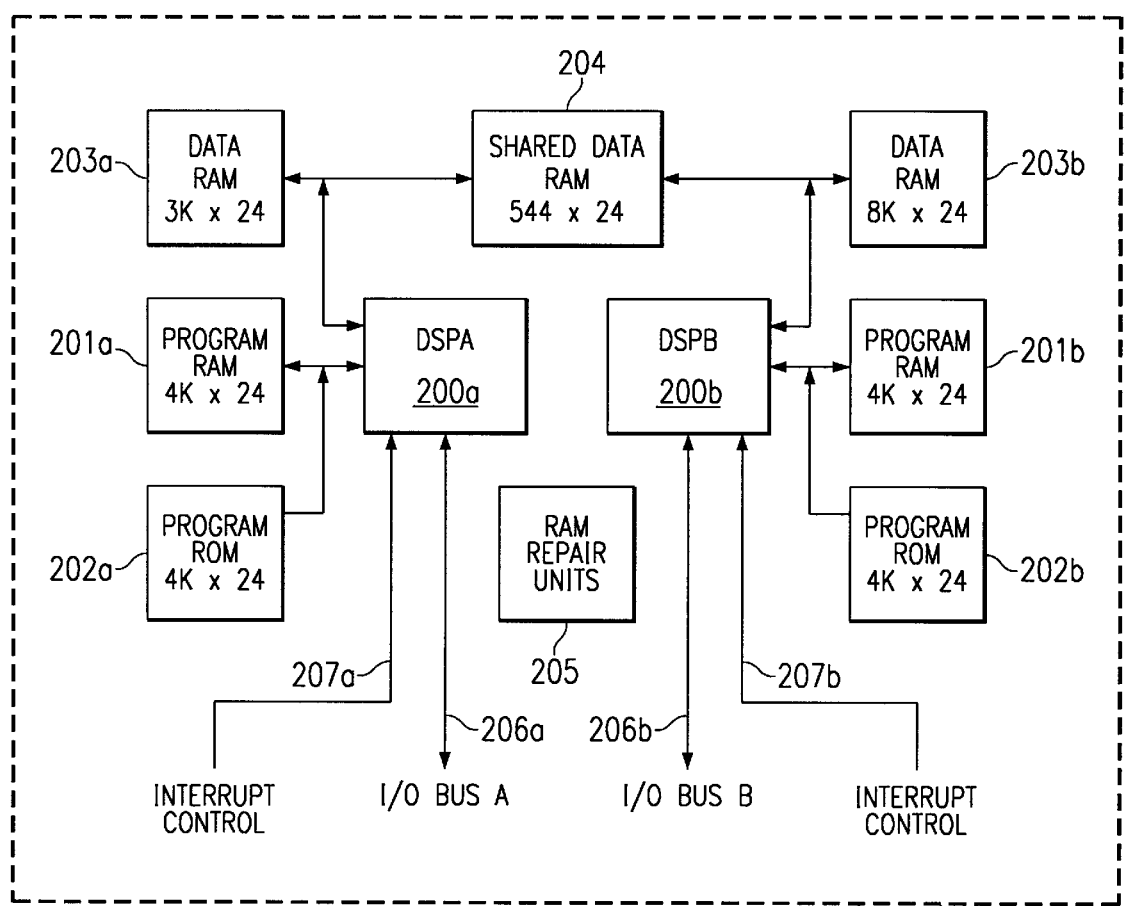
FIG. 2 is a diagram of the processor block of FIG. 1C.

FIG. 2 is a detailed functional block diagram of processor block 101. Processor block 101 includes two DSP cores 200a and 200b, labeled DSPA and DSPB respectively. Cores 200a and 200b operate in conjunction with respective dedicated program RAM 201a and 201b, program ROM 202a and 202*b*, and data RAM 203*a* and 203*b*. Shared data RAM 204, which the DSPs 200*a* and 200*b* can both access, provides for the exchange of data, such as PCM data and processing coefficients, between processors 200*a* and 200*b*. Processor block 101 also contains a RAM repair unit 205 that can repair a predetermined number of RAM locations within the on-chip RAM arrays to increase die yield.

DSP cores 200*a* and 200*b* respectively communicate with the peripherals through I/O Block 102 via their respective I/O buses 206*a*, 206*b*. The peripherals send interrupt and flag information back to the processor block via interrupt interfaces 207*a*, 207*b*.

Figure 3:
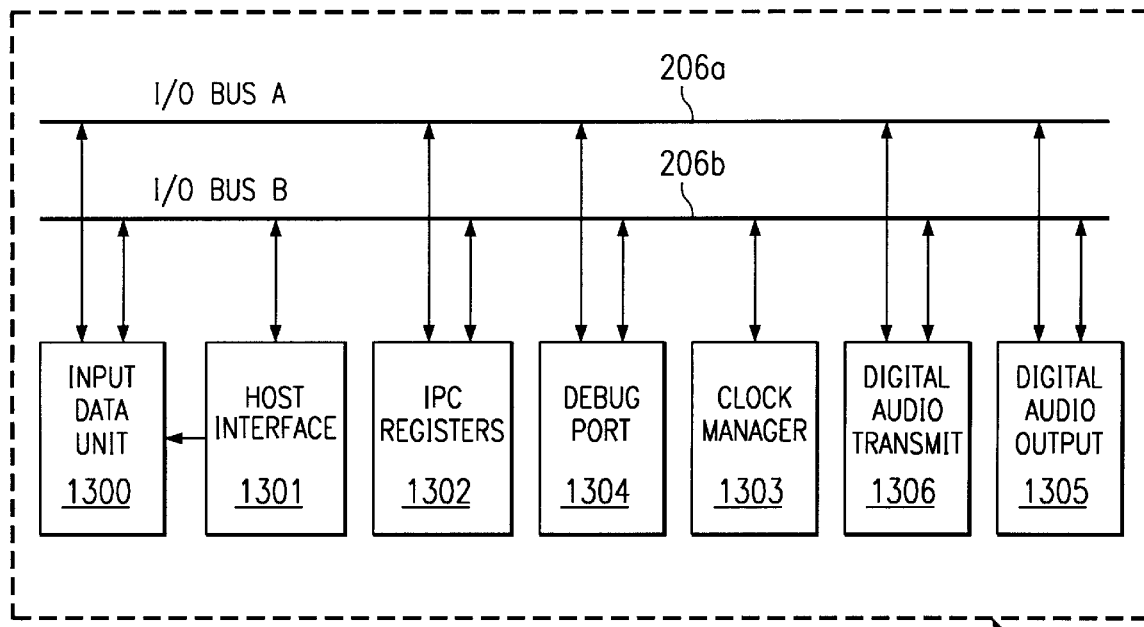
FIG. 3 is a diagram of the primary functional subblock of the I/O block of FIG. 1C.

FIG. 3 is a detailed functional block diagram of I/O block 102. Generally, I/O block 102 contains peripherals for data input, data output, communications, and control. Input Data Unit 1200 accepts either compressed analog data or digital audio in any one of several input formats (from either the CDI or DAI ports). Serial/parallel host interface 1301 allows an external controller to communicate with decoder 100 through the HOST port. Data received at the host interface port 1301 can also be routed to input data unit 1300.

IPC (Inter-processor Communication) registers 1302 support a control-messaging protocol for communication between processing cores 200 over a relatively low-bandwidth communication channel. High-bandwidth data can be passed between cores 200 via shared memory 204 in processor block 101.

Clock manager 1303 is a programmable PLL/clock synthesizer that generates common audio clock rates from any selected one of a number of common input clock rates through the CLKIN port. Clock manager 1303 includes an STC counter which generates time stamp information used by processor block 101 for managing playback and synchronization tasks. Clock manager 1303 also includes a programmable timer to generate periodic interrupts to processor block 101.

Debug circuitry 1304 is provided to assist in applications development and system debug using an external DEBUGGER and the DEBUG port, as well as providing a mechanism to monitor system functions during device operation.

A Digital Audio Output port 1305 provides multichannel digital audio output in selected standard digital audio formats. A Digital Audio Transmitter 1306 provides digital audio output in formats compatible with S/PDIF or AES/EBU.

In general, I/O registers are visible on both I/O buses, allowing access by either DSPA (200*a*) or DSPB (200*b*). Any read or write conflicts are resolved by treating DSPB as the master and ignoring DSPA.

The principles of the present invention further allow for methods of decoding compressed audio data, as well as for methods and software for operating decoder 100. These principles will be discussed in further detail below. Initially, a brief discussion of the theory of operation of decoder 100 will be undertaken.

The Host can choose between serial and parallel boot modes during the reset sequence. The Host interface mode and autobit mode status bits, available to DSPB 200*b* in the HOSTCTL register MODE field, control the boot mode selection. Since the host or an external host ROM always communicates through DSPB. DSPA 200*a* and 200*b* receives code from DSPB 200*b* in the same fashion, regardless of the host mode selected.

In a dual-processor environment like decoder 100, it is important to partition the software application optimally between the two processors 200*a*, 200*b* to maximize processor usage and minimize inter-processor communication. For this the dependencies and scheduling of the tasks of each processor must be analyzed. The algorithm must be partitioned such that one processor does not unduly wait for the other and later be forced to catch up with pending tasks. For example, in most audio decompression tasks including Dolby AC-3, the algorithm being executed consists of 2 major stages: 1) parsing the input bitstream with specified/computed bit allocation and generating frequency-domain transform coefficients for each channel; and 2) performing the inverse transform to generate time-domain PCM samples for each channel. Based on this and the hardware resources available in each processor, and accounting for other housekeeping tasks the algorithm can be suitably partitioned.

Usually, the software application will explicitly specify the desired output precision, dynamic range and distortion requirements. Apart from the intrinsic limitation of the compression algorithm itself, in an audio decompression task the inverse transform (reconstruction filter bank) is the stage which determines the precision of the output. Due to the finite-length of the registers in the DSP, each stage of processing (multiply+accumulate) will introduce noise due to elimination of the lesser significant bits. Adding features such as rounding and wider intermediate storage registers can alleviate the situation.

For example, Dolby AC-3 requires 20-bit resolution PCM output which corresponds to 120 dB of dynamic range. The decoder uses a 24-bit DSP which incorporates rounding, saturation and 48-bit accumulators in order to achieve the desired 20-bit precision. In addition, analog performance should at least preserve 95 dB S/N and have a frequency response of +/−0.5 dB from 3 Hz to 20 kHz.

In a complex real-time system (embedded or otherwise) each sub-system has to perform its task correctly, at the right time and cohesively with all other sub-systems for the overall system to work successfully. While each individual sub-system can be tested and made to work correctly, first attempts at integration most often result in system failure. This is particularly true of hardware/software integration. While the new design methodology, according to the principals of the present invention, can considerably reduce hardware/software integration problems, a good debug strategy incorporated at the design phase can further accelerate system integration and application development. A major requirement of the debug strategy that it should be simple and reliable for it to be confidently used as a diagnostic tool.

Debuggers can be of two kinds: static or dynamic. Static debugging involves halting the system and altering/viewing the states of the various sub-systems via their control/status registers. This offers a lot of valuable information especially if the system can automatically "freeze" on a breakpoint or other trapped event that the user can pre-specify. However, since the system has been altered from its run-time state, some of the debug actions/measurements could be irrelevant, e.g. timer/counter values.

Dynamic debugging allows one to do all the above while the system is actually running the application. For example, one can trace state variables over time just like a signal on an oscilloscope. This is very useful in analyzing real-time behavior. Alternatively, one could poll for a certain state in the system and then take suitable predetermined action.

Both types of debugging require special hardware with visibility to all the sub-systems of interest. For example, in a DSP-based system-on-a-chip such as decoder 100, the debug hardware would need access to all the sub-systems connected to the DSP core, and even visibility into the DSP core. Furthermore, dynamic debugging is more complex than its static counterpart since one has to consider problems of the debug hardware contending with the running subsystems. Unlike a static debug session, one cannot hold off all the system hardware during a debug session since the system is active. Typically, this requires dual-port access to all the targeted sub-systems.

While the problems of dynamic debugging can be solved with complicated hardware there is a simpler solution which is just as effective while generating only minimal additional processor overhead. Assuming that there is a single processor (like a DSP core 200a or 200b), in the system with access to all the control/state variables of interest, a simple interrupt-based debug communication interface can be built for this processor. The implementation could simply be an additional communication interface to the DSP core. For example, this interface could be 2-wire clock+data interface where a debugger can signal read/write requests with rising/falling edges on the data line while holding the clock line high, and debug port sends back an active low acknowledge on the same data line after the subsequent falling edge of the clock.

A debug session involves read/write messages sent from an external PC (debugger) to the processor via this simple debug interface. Assuming multiple-word messages in each debug session, the processor accumulates each word of the message by taking short interrupts from the main task and reading from the debug interface. Appropriate backup and restore of main task context are implemented to maintain transparency of the debug interrupt. Only when the processor 200a, 200b accumulates the entire message (end of message determined by a suitable protocol) is the message serviced. In case of a write message from the PC, the processor writes the specified control variable(s) with specified data.

In case of a read request from the PC, the processor compiles the requested information into a response message, writes the first of these words into the debug interface and simply returns to its main task. The PC then pulls out the response message words via the same mechanism—each read by the PC causes an interrupt to the processor which reloads the debug interface with the next response word till the whole response message is received by the PC.

Such a dynamic debugger can easily operate in static mode by implementing a special control message from the PC to the processor to slave itself to the debug task until instructed to resume the application.

When there are more than one processor in the system the conventional debug strategy discussed above advantageously can be used in multiprocessor systems such as decoder 100, since there is already provision for dual port access to all the sub-systems of interest. However, to use the above simplified strategy in a dual-DSP system like decoder 100 requires changes.

Each processor in such a system will usually have dedicated resources (memory, internal registers etc.) and some shared resources (data input/output, inter-processor communication, etc.). A dedicated debug interface for each processor is also possible, but is avoided since it is more expensive, requires more connections, and increases the communication burden on the PC. Instead, the preferred method is using a shared debug interface through which the PC user can explicitly specify which processor is being targeted in the current debug session via appropriate syntax in the first word of the messaging protocol. On receiving this first word from the PC, the debug interface initiates communication only with the specified processor by sending it an initial interrupt. Once the targeted processor receives this interrupt it reads out the first word, and assumes control of the debug interface (by setting a control bit) and directs all subsequent interrupts to itself. This effectively holds off the other processor(s) for the duration of the current debug session. Once the targeted processor has received all the words in the debug message, it services the message. In case of a write message, it writes the specified control variable(s) with the specified data and then relinquishes control of the debug interface so that the PC can target any desired processor for the next debug session.

In case of a read request, the corresponding read response has to make its way back from the processor to the PC before the next debug session can be initiated. The targeted processor prepares the requested response message, places the first word in the debug interface and then returns to its main task. Once the PC pulls this word out, the processor receives an interrupt to place the next word. Only after the complete response message has been pulled out does the processor relinquish the debug interface so that the PC can start the next debug session with any desired processor.

Since there are multiple processors involved, this scheme advantageously effectively prohibits unsolicited transactions from a processor to the PC debugger. This constraint precludes many contention issues that would otherwise have to be resolved.

Since the PC debugger can communicate with every processor in the system, the scope of control and visibility of the PC debugger includes every sub-system that can be accessed by the individual processors. This is usually quite sufficient for even advanced debugging.

Whether static or dynamic, all the functions of a debugger can be viewed as reading state variables or setting control variables. However, traps and breakpoints are worthy of special discussion.

During a debug session, when the PC user desires to setup a breakpoint at a particular location in the program of the processor, it has to backup the actual instruction at that location and replace it with a trap instruction. The trap is a special instruction designed such that the processor takes a dedicated high priority interrupt when it executes this instruction. It basically allows a pre-planned interruption of the current task.

In the single-processor strategy, when the processor hits a trap it takes an interrupt from the main task, sends back an unsolicited message to the PC, and then dedicates itself to process further debug messages from the PC (switches to static mode). For example the PC could update the screen with all the system variables and await further user input. When the user issues a continue command, the PC first replaces the trap instruction with the backed-up (original) instruction and then allows the processor to revert to the main task (switches to dynamic mode).

In the multi-processor debug strategy, unsolicited messages from a processor to the PC are prohibited in order to resolve hardware contention problems. In such a case, the breakpoint strategy needs to be modified. Here, when a processor hits a trap instruction, it takes the interrupt from its main task, sets a predetermined state variable (for example, Breakpoint_Flag), and then dedicates itself to process further debug messages from the PC (switches to static mode). Having setup this breakpoint in the first place, the PC should be regularly polling the Breakpoint_Flag state variable on this processor—although at reasonable intervals so as not to waste processor bandwidth. As soon as it detects Breakpoint_Flag to be set, the PC issues a debug message to clear this state variable to setup for the next breakpoint. Then, the PC proceeds just as in the single-processor case.

All other program flow debug functions, such as step into, step over, step out of, run to cursor etc. are implemented from the PC by appropriately placing breakpoints and allowing the processor to continue and execute the desired program region.

Based on application and design requirements, a complex real-time system, such as audio decoder 100, is usually partitioned into hardware, firmware and software. The hardware functionality described above is implemented such that it can be programmed by software to implement different applications. The firmware is the fixed portion of software portion including the boot loader, other fixed function code and ROM tables. Since such a system can be programmed, it is advantageously flexible and has less hardware risk due to simpler hardware demands.

There are several benefits to the dual core (DSP) approach according to the principles of the present invention. DSP cores 200A and 200B can work in parallel, executing different portions of an algorithm and increasing the available processing bandwidth by almost 100%. Efficiency improvement depends on the application itself. The important thing in the software management is correct scheduling, so that the DSP engines 200A and 200B are not waiting for each other. The best utilization of all system resources can be achieved if the application is of such a nature that can be distributed to execute in parallel on two engines. Fortunately, most of the audio compression algorithms fall into this category, since they involve a transform coding followed by fairly complex bit allocation routine at the encoder. On the decoder side the inverse is done. Firstly, the bit allocation is recovered and the inverse transform is performed. This naturally leads into a very nice split of the decompression algorithm. The first DSP core (DSPA) works on parsing the input bitstream, recovering all data fields, computing bit allocation and passing the frequency domain transform coefficients to the second DSP (DSPB), which completes the task by performing the inverse transform (IFFT or IDCT depending on the algorithm). While the second DSP is finishing the transform for a channel n, the first DSP is working on the channel n+1, making the processing parallel and pipelined. The tasks are overlapping in time and as long as tasks are of the same complexity, there will be no waiting on either DSP side.

Figure 4:
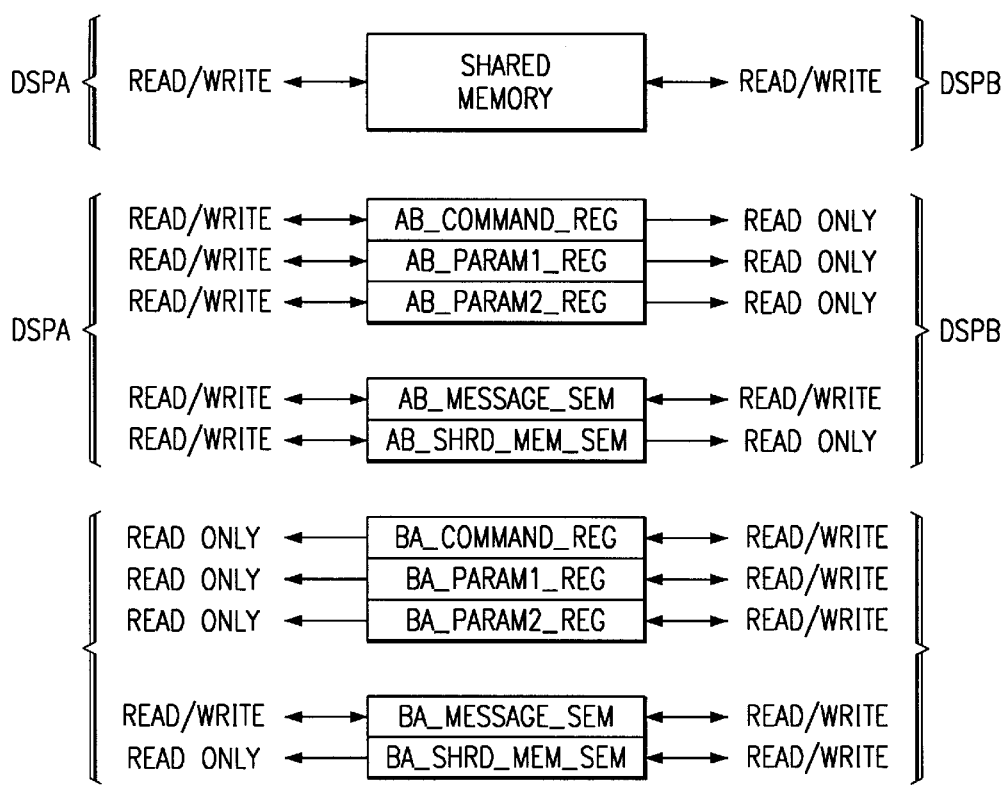
FIG. 4 is a diagram of the interprocessor communications (IPC) registers as shown in FIG. 3.

Decoder 100, as discussed above, includes shared memory of 544 words as well as communication "mailbox" (IPC block 1302) consisting of 10 I/O registers (5 for each direction of communication). FIG. 4 is a diagram representing the shared memory space and IPC registers (1302).

One set of communication registers looks like this
(a) AB_command_register (DSPA write/read, DSPB read only)
(b) AB_parameter1_register (DSPA write/read, DSPB read only)
(c) AB_parameter2_register (DSPA write/read, DSPB read only)
(d) AB_message_semaphores (DSPA write/read, DSPB write/read as well)
(e) AB_shared_memory_semaphores (DSPA write/ read, DSP B read only) where AB denotes the registers for communication from DSPA to DSPB. Similarly, the BA set of registers are used in the same manner, with simply DSPB being primarily the controlling processor.

Shared memory 204 is used as a high throughput channel, while communication registers serve as low bandwidth channel, as well as semaphore variables for protecting the shared resources.

Both DSPA and DSPA 200a, 200b can write to or read from shared memory 204. However, software management provides that the two DSPs never write to or read from shared memory in the same clock cycle. It is possible, however, that one DSP writes and the other reads from shared memory at the same time, given a two-phase clock in the DSP core. This way several virtual channels of communications could be created through shared memory. For example, one virtual channel is transfer of frequency domain coefficients of AC-3 stream and another virtual channel is transfer of PCM data independently of AC-3. While DSPA is putting the PCM data into shared memory, DSPB might be reading the AC-3 data at the same time. In this case both virtual channels have their own semaphore variables which reside in the AB_shared_memory_semaphores registers and also different physical portions of shared memory are dedicated to the two data channels. AB_command_register is connected to the interrupt logic so that any write access to that register by DSPA results in an interrupt being generated on the DSP B, if enabled. In general, I/O registers are designed to be written by one DSP and read by another. The only exception is AB_message_semaphore register which can be written by both DSPs. Full symmetry in communication is provided even though for most applications the data flow is from DSPA to DSP B. However, messages usually flow in either direction, another set of 5 registers are provided as shown in FIG. 4 with BA prefix, for communication from DSPB to DSPA.

The AB_message_semaphore register is very important since it synchronizes the message communication. For example, if DSPA wants to send the message to DSPB, first it must check that the mailbox is empty, meaning that the previous message was taken, by reading a bit from this register which controls the access to the mailbox. If the bit is cleared, DSPA can proceed with writing the message and setting this bit to 1, indicating a new state, transmit mailbox full. The DSPB may either poll this bit or receive an interrupt (if enabled on the DSPB side), to find out that new message has arrived. Once it processes the new message, it clears the flag in the register, indicating to DSPA that its transmit mailbox has been emptied. If DSPA had another message to send before the mailbox was cleared it would have put in the transmit queue, whose depth depends on how much message traffic exists in the system. During this time DSPA would be reading the mailbox full flag. After DSPB has cleared the flag (set it to zero), DSPA can proceed with the next message, and after putting the message in the mailbox it will set the flag to I. Obviously, in this case both DSPs have to have both write and read access to the same physical register. However, they will never write at the same time, since DSPA is reading flag until it is zero and setting it to 1, while DSPB is reading the flag (if in polling mode) until it is 1 and writing a zero into it. These two processes a staggered in time through software discipline and_ management.

When it comes to shared memory a similar concept is adopted. Here the AB_shared_memory_semaphore register is used. Once DSPA computes the transform coefficients but before it puts them into shared memory, it must check that the previous set of coefficients, for the previous channel has been taken by the DSPB. While DSPA is polling the semaphore bit which is in AB_shared_memory_ semaphore register it may receive a message from DSPB, via interrupt, that the coefficients are taken. In this case DSPA resets the semaphore bit in the register in its interrupt handler. This way DSPA has an exclusive write access to the AB_shared_memory_semaphore register, while DSPB can only read from it. In case of AC-3, DSPB is polling for the availability of data in shared memory in its main loop, because the dynamics of the decode process is data driven. In other words there is no need to interrupt DSPB with the message that the data is ready, since at that point DSPB may not be able to take it anyway, since it is busy finishing the previous channel. Once DSPB is ready to take the next channel it will ask for it. Basically, data cannot be pushed to DSPB, it must be pulled from the share memory by DSPB.

The exclusive write access to the AB_shared_memory_ semaphore register by DSPA is all that more important if there is another virtual channel (PCM data) implemented. In this case, DSPA might be putting the PCM data into share memory while DSPB is taking AC-3 data from it. So, if DSPB was to set the flag to zero, for the AC-3 channel, and DSPA was to set PCM flag to 1 there would be an access collision and system failure will result. For this reason, DSPB is simply sending message that it took the data from share memory and DSPA is setting share memory flags to zero in its interrupt handler. This way full synchronization is achieved and no access violations performed.

When designing a real time embedded system both hardware and software designers are faced with several important trade-off decisions. For a given application a careful balance must be obtained between memory utilization and the usage of available processing bandwidth. For most applications there exist a very strong relationship between the two: memory can be saved by using more MIPS or MIPS could be saved by using more memory. Obviously, the trade-off exists within certain boundaries, where a minimum amount of memory is mandatory and a minimum amount of processing bandwidth is mandatory.

An example of such trade-off in the AC-3 decompression process is decoding of the exponents for the sub-band transform coefficients. The exponents must arrive in the first block of an AC-3 frame an may or may not arrive for the subsequent blocks, depending on the reuse flags. But also, within the block itself, 6 channels are multiplexed and the exponents arrive in the bitstream compressed (block coded) for all six channels, before any mantissas of any channel are received. The decompression of exponents has to happen for the bit allocation process as well as scaling of mantissas. However, once decompressed, the exponents might be reused for subsequent blocks. Obviously, in this case they would be kept in a separate array (256 elements for 6 channels amounts to 1536 memory locations). On the other hand, if the exponents are kept in compressed form (it takes only 512 memory locations) recomputation would be required for the subsequent block even if the reuse flag is set. In decoder 100 the second approach has been adopted for two reasons: memory savings (in this case exactly 1k words) and the fact that in the worst case scenario it is necessary to recompute the exponents anyway.

The proper input FIFO is important not only for the correct operation of the DSP chip itself, but it can simplify the overall system in which decoder 100 reside. For example, in a set-top box, where AC-3 audio is multiplexed in the MPEG2 transport stream, the minimum buffering requirement (per the MPEG spec) is 4 kbytes. Given the 8 kbyte input FIFO in decoder 100 (divisible arbitrarily in two, with minimum resolution of 512 bytes), any audio bursts from the correctly multiplexed MPEG2 transport stream can be accepted, meaning that no extra buffering is required upstream in the associated demux chip. In other words, demux will simply pass any audio data directly to the codec 100, regardless of the transport bit rate, thereby reducing overall system cost.

Also, a significant amount of MIPS can be saved in the output FIFOs, which act as a DMA engine, feeding data to the external DACs. In case there are no output FIFOs the DSP has to be interrupted at the Fs rate (sampling frequency rate). Every interrupt has some amount of overhead associated with switching the context, setting up the pointers, etc. In the case of the codec 100, a 32 sample output is provided FIFO with half-empty interrupt signal to the DSP, meaning that the DSP is now interrupted at Fs/16 rate. Subsequently, any interrupt overhead is reduced by a factor of 16 as well, which can result in 2–3 MIPS of savings.

In the dual DSP architecture of decoder 100 the amount of share memory is critical. Since this memory is essentially dual ported resulting in much larger memory cells and occupying much more die area, it is very critical to size it properly. Since decoder 100 has two input data ports, and the input FIFO is divisible to receive data simultaneously from the two ports, the share memory was also designed to handle two data channels. Since the size of one channel of one block of AC-3 data is 256 transform coefficients a 256 element array has been allocated. That is, 256 PCM samples can be transferred at the same time while transferring AC-3 transform coefficients. However, to keep two DSP cores 200a and 200b in sync and in the same context, an additional 32 memory locations are provided to send a context descriptor with each channel from DSPA to DSPB. This results in the total share memory size of 544 elements, which is sufficient not only for AC-3 decompression implementation but also for MPEG 5.1 channel decompression as well as DTS audio decompression.

The PCM buffer size is another critical element since all 6 channels are decompressed. Given the AC-3 encoding scheme (overlap and add), theoretically a minimum of 512 PCM data buffer is required. However, given a finite decoder latency, another buffer of 256 samples for each channel is required so that ping-pong strategy can be employed. While one set of 256 samples is being processed, another set of 256 is being decoded. A decode process must be completed before all samples in PCM buffer are played, but given a MIPS budget this is always true. So, no underflow conditions should occur.

A more detailed description of the system software and firmware can now be provided. Decoder 100 supports two boot loader programs, one residing in each ROM 202 associated with each of the two DSP cores 200. DSPB (200b) acts as a main interface to the Host, as in runtime, accepting application code for both DSPs 200, loading its own program or data memory 202b/203b, and in addition, transferring the application code for DSPA to the boot loader residing in DSPA (200a), which in turn loads its program memory 202a and data memory 203a.

The Host interface mode bits and autoboot mode status bit are available to DSPB in the HOSTCTL register [23:20] (MODE field). Data always appears in the HOSTDATA register one byte at a time. The only difference in DSPB boot loader code for different modes, is the procedure of getting a byte from the HOSTDATA register. Once the byte is there, either from the serial or parallel interface or from an external memory in autoboot mode, the rest of DSPB boot loader code is identical for all modes. Upon determining the mode from the MODE bits, DSPB re-encodes the mode in the DBPST register in the following way: 0 is for autoboot, 1 for Ser. Mode, and 2 for Parallel Mode. This more efficient encoding of the mode is needed, since it is being invoked every time in the procedure Get_Byte_From_Host. During application run-time, the code does not need to know what the Host interface mode is, since it is interrupt-driven and the incoming or outgoing byte is always in the HOSTDATA register. However, during the boot procedure, a polling strategy is adopted and for different modes different status bits are used. Specifically, HIN-BSY and HOUTRDY bits in the HOSTCTL register are used in the parallel mode, and IRDY and ORDY bits from SCPCN register are used in the serial mode.

Each DSP 200a, 200b has an independent reset bit in its own CONTROL register (CR) and can toggle its own reset bit after successful boot procedure. DSPA soft reset will reset only DSPA core and will not alter DSPA's MAPCTL, PMAP, and DMAP memory repair registers. DSPB soft reset will reset DSPB core as well as all I/O peripherals, but will not alter DSPB's MAPCTL, PMAP, and DMAP memory repair registers. Synchronized start is not an issue since the downloaded application code on each DSP handles synchronization.

Three major subroutines are described here. The first one is Get_Byte_From_Host, which is mode-sensitive (checking is done on the encoded value in DBPTMP register). The byte is returned in the AR6 register.

The second subroutine is Send_Byte_To_Host, which takes the byte in AR6 and sends it to the Host. This routine is not mode-sensitive, since when a byte is to be sent to the Host, the previous byte has already been picked up. This is true since messages returning to the Host are only byte-wide and only of two kinds, solicited or unsolicited.

Solicited
BOOT_START
DSPA/DSPB_MEMORY_FAILURE
BOOT_SUCCESS
BOOT_ERROR_CHECKSUM (in which case the Host is waiting for the response)
Unsolicited
BOOT_ERROR_ECHO
BOOT_ERROR_TIMEOUT (in which case the Host is sending or waiting to send image data and therefore has no pending byte to read).

In either case, DSPB can safely send out a byte without checking whether the resource is busy.

The third important subroutine is Get_Word_From_Host. This subroutine returns one 24 bit word in the COM_BA register after using ACC0 and AR6 as a temporary storage. Actually, Get_Byte_From_Host is invoked three times within Get_Word_From_Host and the incoming byte in AR6 is shifted appropriately in ACC0. The Get_Word_From_Host subroutine also updates the checksum by using ADD instead Of XOR. The running checksum is kept in register PAR_2_BA. Note that there is no Send_Word_To_Host subroutine, since all replies to the Host are a full byte wide.

Interprocessor Communication (IPC) and Protocol can now be described in further detail in view of the discussion above and FIG. 4. The Dual DSP processor architecture according to the principles of the present invention, is advantageously very powerful in the effective use of available MIPS. However, it is important to remember that the target application must be such that it is relatively easy to split processing between the two engines. Both AC-3 and MPEG-2 multichannel surround applications possess this quality. The essential element to an efficient implementation of these applications is the effective communication between the two engines. In decoder 100 the shared resources between the two processors are the 544×24 word data memory 204 and the communication register file 1302 consisting of ten I/O registers.

These shared resources can advantageously synchronize the 2 DSPs for the task at hand.

1. Shared Data Memory

The basic concept behind the share memory is that of master and Slave. DSPB is defined as the master in the system, and is also the master of the write access to the share memory. In the case of a read access DSPA is the master of the share memory 1302. Both processors are allowed to write and read to and from the shared memory.

The concept of the Access Token is introduced here. Most of the discussion that follows concentrates on write token, however, the same concept applies to read token as well. It is possible that one processor has the ownership of write token and the other has the ownership of the read token. It is also possible that one processor has the ownership of both tokens.

The AB_semaphore_token register (FIG. 4) has the following format:

TABLE 1

| AB_semaphore_token register | | | |
|---|---|---|---|
| RD_PRIVILEGE_B | WR_USE_A | PCM_DATA_READY | TC_READY |

Note that DSPA can both write and read into this register and that DSPB can only read from this register.

The BA_semaphore_token register has the following format:

TABLE 2

| BA_semaphore_token register | | | |
|---|---|---|---|
| WR_PRIVILEGE_A | RD_USE_B | BA_DATA1_READY | BA_DATA2_READY |

Note that DSPB can both write and read into this register and that DSPA can only read from this register A. Communication Register File The communication register file (FIG. 4) consists of eight registers. They are split into two groups of four registers each, as shown below.

```
COMMAND_AB [23:0]
PARAMETER_0_AB [23:0]
PARAMETER_1_AB [23:0]
COMMAND_AB_PENDING [0]
AB_semaphore token
register
COMMAND_BA [23:0]
PARAMETER_0_BA [23:0]
PARAMETER_1_BA [23:0]
COMMAND_BA_PENDING [0]
BA_semaphore_token
register
```

The first group of four registers is used by DSPA to send commands to DSPB, along with appropriate parameters. The second set of registers is used by DSPB to send commands and parameters to DSPA. So, the communication protocol is completely symmetrical.

Figures 5A, 5B:
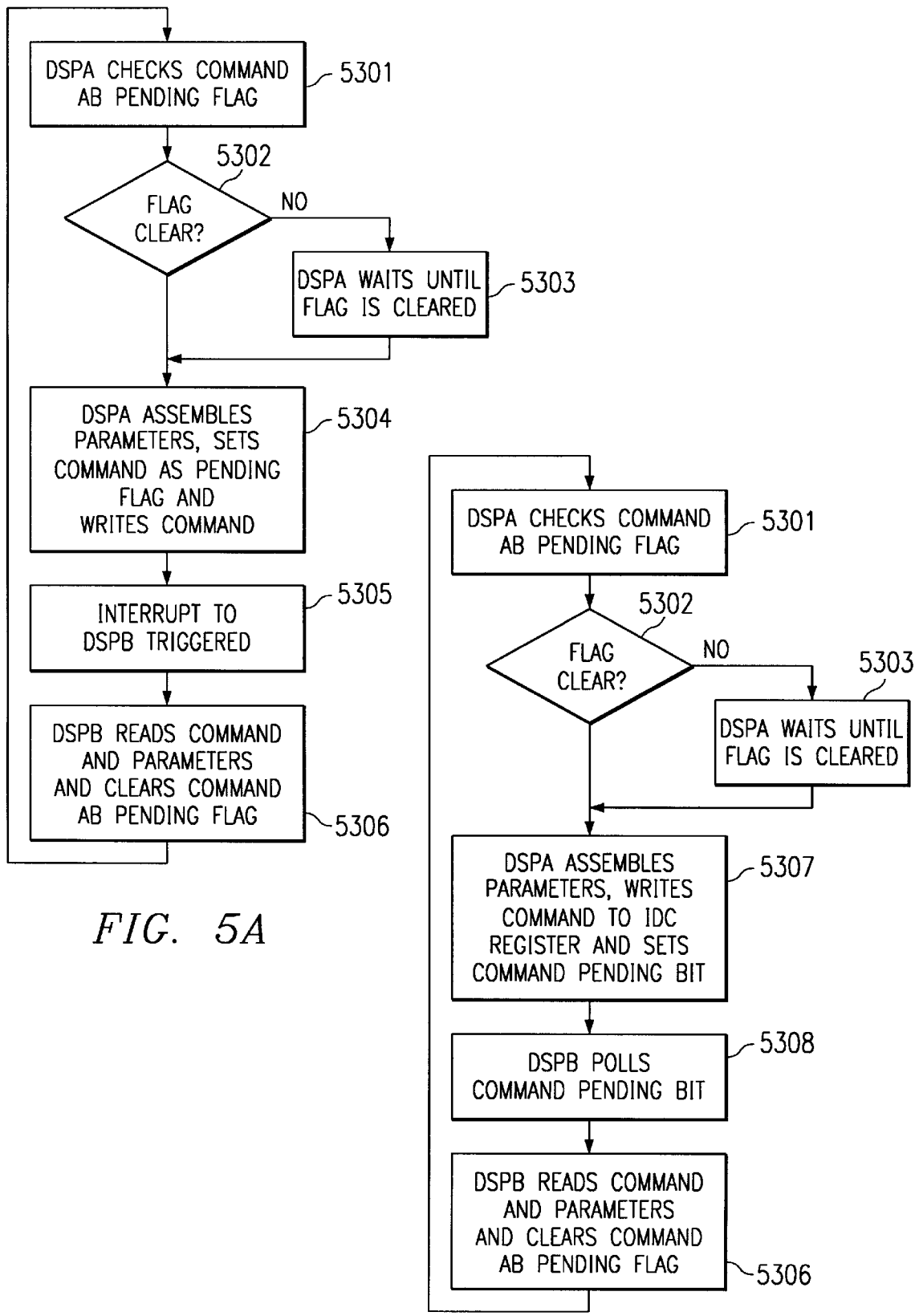
FIG. 5A is a flow diagram representing an interprocessor messaging operation.
FIG. 5B is a flow diagram representing an alternate interprocessor messaging operation.

Consider the case when DSPA is sending a command to DSPB as shown in FIG. 5A. Before DSPA can send a command, it must check the COMMAND_AB_PENDING flag to make sure that the previous command from A to B was taken by DSPB (Step 5301). If it is appropriate to send the message (Step 5302), DSPA assembles the parameters, sets the COMMAND_AB_PENDING flag and writes the command itself (Step 5304). Otherwise, DSPA waits at Step 5303. The event of writing the COMMAND_AB_PENDING triggers a DSPB interrupt (Step 5305), which in turn reads the command and its parameters and at the end clears the COMMAND_AB_PENDING flag (Step 5306). This allows DSPA to then send another command if necessary.

FIG. 5B_ shows a substantially similar messaging process. In this case, DSPB polls the command pending but at Step 5308 to determine if a message is waiting, rather than receiving an active interrupt from DSPA.

It should be noted that both DSPs have write access to the COMMAND PENDING register but the software discipline will ensure that there is never a conflict in the access. If DSP(A/B) 200a, 200b cannot issue the command because the COMMAND_AB_PENDING bit is set, it will either wait or put a message into a transmit queue. Once the command is received on the other side, the receiving DSP can either process the command (if it is a high-priority command) or store it into a receive queue and process the command later. Scheduling of command execution will be such that minimum latency is imposed in the system. Regular checking at the channel resolution (about 1 ms) will ensure minimal latency in processing commands.

When one processor is not accepting messages, a time-out is required to inform the Host about the potential problem. If DSPA is not responding to messages from DSPB, the Host will be notified by DSPB. If DSPB is not responding to DSPA, then, most likely, it is not responding to the Host either, and Host will know that explicitly. If DSPB is not responding to DSPA, but it is responding to the Host, DSPA will stall, will stop requesting data, the output buffers will underflow and the demux (or upstream delivery engine) will overflow in pushed systems or time-out in pulled systems.

The list of messages includes:

Messages from A to B:

1) sync search and lock conditions (various modes—PES, AC-3)
2) CRC problems to initiate error concealment procedure in DSPB
3) bitstream status and info
4) decode status and info
5) TC and PCM data transfer (no commands necessary as explained earlier)
   (descriptors that come synchronously with the TCs convey a lot of information: decode context as well as PTS for A/V sync: see A/V sync section)

Messages from B to A:

1) Kick_start_sync_search_and_decode (or simply go)
2) control and status messages that DSPA needs to execute on behalf of DSPB based upon the Host's request, including initialization and run time messages (setting up the registers in the input block etc.)
3) TCs_taken (PCM_data_taken)
4) boot messages (in case that DSPB boots DSPA)

The principles of the present invention provide for accurate and fast interprocessor communications in any kind of multiprocessor system. Particularly advantageous is the application to multiprocessor audio systems, such as the audio decoder discussed above.

Although the invention has been described with reference to a specific embodiments, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and the specific embodiment disclose may be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore, contemplated that the claims will cover any such modifications or embodiments that fall within the true scope of the invention.

What is claimed:

1. A method of exchanging messages between first and second processors forming a portion of a single-chip processing device, comprising the steps of:

checking a pending flag in a register with the first processor;

if the flag is in a first selected logic state indicating that a second register is ready for messaging, setting the pending flag to a second selected logic state with the first processor to indicate a message is being sent;

writing a message into the second register with the first processor;

generating an interrupt to the second processor;

reading the message from the second register with the second processor when the pending flag is in the second logic state; and setting the pending flag to the first logic state with the second processor to indicate the second register is ready for messaging.

2. The method of claim 1 wherein the first and second processors comprise digital signal processors.

3. The method of claim 2 wherein the first and second processors comprise digital signal processors in an audio decoder system.

4. The method of claim 1 and further comprising the step of waiting with the first processor until the second processor sets the pending bit to the first logic state if after the step of checking the pending bit is in the second state.

5. The method of claim 2 and further comprising the step of polling the pending flag with the second processor to determine if the pending flag is in the second logic state.

6. The method of claim 1 and further comprising the step of generating an interrupt to the second processor when a message has been written into said second register.

7. A method of operating a single-chip audio decoder having first and second digital signal processors for decompressing compressed audio data and a set of interprocessor communications registers comprising the steps of:

checking a pending flag in a first one of the registers with the first processor;

if the pending flag indicates that a second one of the registers is available for exchanging messages, setting the pending flag with the first processor to indicate a message is being sent;

writing a message into the second register with the first processor;

reading the message from the second register with the second processor when the pending flag indicates that a message is being sent; and resetting the pending flag in the first register with the second processor after said step of reading to indicate to the first processor that the second register is available for exchanging messages.

8. The method of claim 7 and further comprising the step of generating an interrupt to the second processor substantially concurrent with said step of writing.

9. The method of claim 7 and further comprising the step of polling said first register with the second processor to determine if a message is being sent.

10. The method of claim 7 and further comprising the step of placing a second message in a queue with the first processor when the pending flag indicates the second register is not available for messaging.

11. The method of claim 7 wherein the compressed audio data comprises AC3 compressed data.

12. The method of claim 7 wherein the compressed audio data is in an MPEG-2 format.

13. The method of claim 7 wherein the message comprises a status message.

14. The method of claim 7 wherein the message comprises a boot message.

15. An audio decoder fabricated on a single chip for decompressing compressed audio data comprising:

first and second communications registers;

a first processor operable to:
check a flag in said first register to determine if said second register is available for messaging;
changing said flag to indicate a message is being sent if the said flag indicates that said second register is available for exchanging messages; and
writing a message into said second register; and a second processor operable to:
read said message from said second register with said second processor when said flag indicates that a message is being sent; and
reset said flag in said first register with the after reading said message to indicate to said first processor that said second register is available for exchanging messages.

16. The audio decoder of claim 15 wherein said first and second processors comprise digital signal processors fabricated on a single integrated circuit chip.

17. The audio decoder of claim 15 wherein said first processor is further operable to send an interrupt to said second processor when a message is being sent through said second register.

18. The audio decoder of claim 15 wherein said second processor is further operable to poll said first register to determine whether a message is being sent through said second register.

19. The audio decoder of claim 15 wherein said compressed data comprises transform encoded audio data.

20. The audio decoder of claim 19 wherein said first processor is operable to extract frequency domain coefficients from a received stream of compressed audio data and said second processor is operable to perform a reverse transform operation on said coefficients.

* * * * *